United States Patent [19]

Mourray

[11] Patent Number: 4,624,347

[45] Date of Patent: Nov. 25, 1986

[54] PISTON ASSEMBLY FOR SHOCK ABSORBER

[75] Inventor: Jack W. Mourray, West Bloomfield, Mich.

[73] Assignee: Ford Motor Company, Dearborn, Mich.

[21] Appl. No.: 797,770

[22] Filed: Nov. 14, 1985

Related U.S. Application Data

[63] Continuation of Ser. No. 573,274, Jan. 23, 1984, abandoned.

[51] Int. Cl.⁴ .................................................. F16F 9/34
[52] U.S. Cl. ........................... 188/322.15; 137/493.9; 188/280; 188/282; 188/317; 267/127; 280/714
[58] Field of Search ............ 188/280, 282, 317, 322.15, 188/320; 267/127; 137/493.9; 280/714

[56] References Cited

U.S. PATENT DOCUMENTS

| | | | |
|---|---|---|---|
| 2,316,924 | 4/1943 | Whisler, Jr. ............................ | 188/282 |
| 2,355,491 | 8/1944 | Whisler, Jr. ............................ | 188/317 X |
| 2,653,682 | 9/1953 | Whisler, Jr. et al. ................. | 188/282 |
| 2,697,496 | 12/1954 | McIntyre ............................... | 188/280 |
| 2,748,898 | 6/1956 | Bourcier de Carbon ............ | 188/282 |
| 3,074,515 | 1/1963 | MacLellan ............................ | 188/280 |
| 3,450,235 | 6/1969 | Lohr ...................................... | 188/282 |
| 3,561,575 | 2/1971 | Allinquant ........................... | 188/282 |
| 3,570,635 | 3/1971 | Takagi .................................. | 188/282 |
| 3,882,977 | 5/1975 | Watanabe ............................. | 188/282 |
| 3,981,380 | 9/1976 | Andre ................................... | 188/282 |
| 4,004,662 | 1/1977 | Sorgatz et al. ...................... | 188/288 |
| 4,114,735 | 9/1978 | Kato ...................................... | 188/282 |
| 4,203,507 | 5/1980 | Tomita et al. ....................... | 188/317 |
| 4,241,815 | 12/1980 | Federspiel ............................ | 188/282 |
| 4,352,417 | 10/1982 | Stinson ............................ | 188/322.15 |
| 4,484,669 | 11/1984 | Kato ................................ | 188/322.15 |

FOREIGN PATENT DOCUMENTS

| | | | |
|---|---|---|---|
| 2426326 | 12/1974 | Fed. Rep. of Germany ...... | 188/280 |
| 78834 | 6/1980 | Japan ................................... | 188/282 |
| 699896 | 11/1953 | United Kingdom ................ | 188/282 |

*Primary Examiner*—George E. A. Halvosa
*Attorney, Agent, or Firm*—Jerome R. Drouillard; Roger L. May

[57] ABSTRACT

A piston assembly for a shock absorber includes a first set of one or more ports controlled by two valve mechanisms, a second set of ports controlled by a single valve mechanism, and a third set of ports uncontrolled by any valve mechanism. All three sets of ports conduct fluid during the compression and rebound strokes.

3 Claims, 3 Drawing Figures

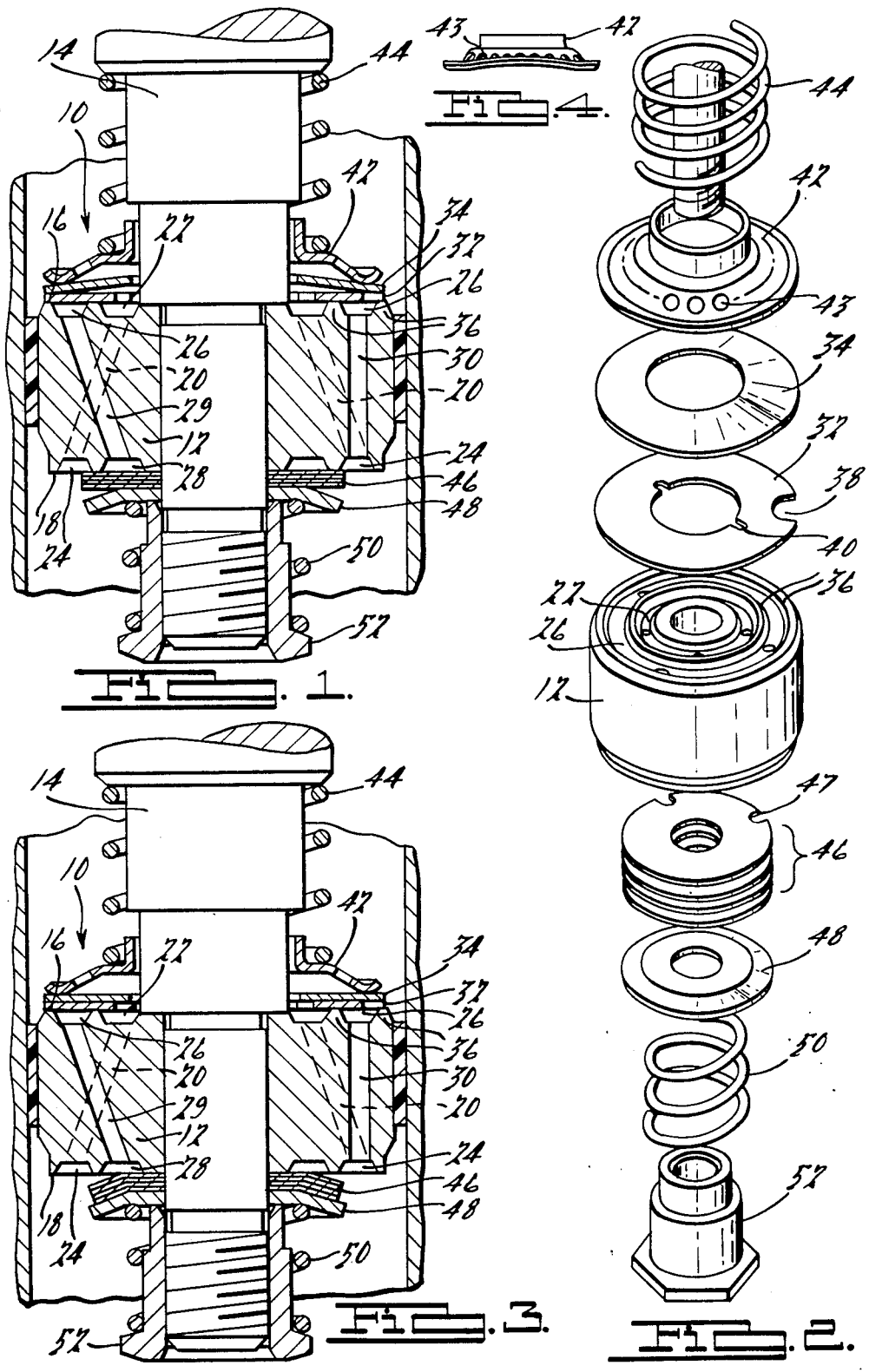

PISTON ASSEMBLY FOR SHOCK ABSORBER

This application is a continuation of application Ser. No. 573,274, filed Jan. 23, 1984, now abandoned.

BACKGROUND OF THE INVENTION

1. Field of the Invention

This invention relates to automotive shock absorbers in general and more particularly to a piston assembly for such shock absorbers.

2. Disclosure Information

Automotive shock absorbers of the fluid damper type have been in use for many years. The most common configuration for these devices includes a hollow cylindrical working chamber which telescopically receives a cylindrical piston incorporating valving. Most commonly the working chamber is attached to a moving part of the vehicle's suspension such as a lower control arm, whereas the piston is connected to the vehicle's frame or body by means of a piston rod.

The shock absorber is thus interposed via the suspension system between a roadwheel and the vehicle's frame or body. Vertical motion of the roadwheel resulting from either imperfections in the road surface or from roll of the vehicle's body during cornering maneuvers or the like causes a corresponding extension or contraction of the shock absorber along its major axis. This extension is often termed "rebound" or the "rebound stroke", while the contraction motion is termed "compression" or the "compression stroke". During rebound, fluid flows from above the piston and through ports and associated valving contained in the piston until the space below the piston is reached. During compression, fluid flows from below the piston and again through ports and associated valving until the space above the piston is reached. In this application, the term "port" denotes a fluid conducting channel running between the upper and lower faces of the piston.

Shock absorbers are employed in automotive suspensions for the purpose of improving vehicle ride and handling characteristics. For example, shock absorbers assist in controlling body lean on corners and help eliminate the transmission of road induced vibrations to the vehicle body.

A variety of valving systems have evolved for use with shock absorbers of the type with which instant invention is concerned. One example is disclosed in U.S. Pat. No. 4,203,507 to Tomita, et al. Tomita discloses an axially-drilled piston with compression and rebound ports and flow governing means generally comprising annular discs of varying configuration. Similarly, U.S. application Ser. No. 318,646, now abandoned, assigned to the assignee of this application, discloses another of my inventions directed toward an axially-drilled shock absorber piston having annular flow-governing discs.

Another type of shock absorber piston design is characterized by cross-drilled compression and rebound ports. U.S. Pat. No. 2,316,924 to Whisler and U.S. Pat. No. 4,004,662 to Sorgatz et all each disclose designs of this latter type. The instant invention is directed to an improved cross-drilled shock absorber piston assembly.

SUMMARY OF THE INVENTION

The present invention is directed to a piston assembly for an automotive shock absorber having cross-drilled compression and rebound ports. Compression flow is routed not only to the compression ports but may also be routed through one or more axially-drilled orifice ports. Rebound flow is routed through the orifice and compression ports during low and moderate rates of rebound. During high velocity rebound, flow is conducted through all three ports, i.e., compression, rebound and orifice. Flow control during both compression and rebound is partially achieved by means of two annular valve discs superimposed on the upper face of the piston. Additionally, a valve disc stack abutting the lower face of the piston provides rebound control. The present piston assembly is suitable for use in MacPherson strut and other suspension systems and may be employed with or without gas pressurization of the hydraulic fluid.

In its broadest sense, the invention claimed herein comprises a piston assembly for a shock absorber having first and second means for conducting hydraulic flow through the piston during all compression and rebound strokes, and means for causing rebound flow to change from a first condition, existing at relatively lower rebound rates, wherein the hydraulic fluid flows primarily through the first means, to a second condition, existing at relatively higher rebound rates, wherein the hydraulic fluid flows primarily through the second means.

BRIEF DESCRIPTION OF THE DRAWINGS

Reference is now made to the accompanying drawings in which:

FIG. 1 is a cross-sectional view of a piston and rod assembly.

FIG. 2 is an exploded perspective view of the piston assembly.

FIG. 3 is similar to FIG. 1 and shows the piston assembly during high speed rebound.

DETAILED DESCRIPTION OF THE PREFERRED EMBODIMENT

As shown in FIG. 1, the piston assembly 10 includes a generally cylindrical body 12 mounted on a piston rod 14. Body 12 has three types of ports running between its upper face 16 and its lower face 18. Specifically, one or more compression ports 20 run between an inboard annular groove 22 contained in the upper face 16 and an outboard annular groove 24 contained in lower face 18. One or more rebound ports 29 run between an outboard annular groove 26 contained in the upper face 16 and an inboard annular groove 28 contained in the lower face 18. Finally, one or more orifice ports 30 run between annular groove 26 and annular groove 24.

Two annular valve discs, 32 and 34, are mounted in superposition on upper face 16. Disc 32 is flat and of sufficient diameter to bridge across annular lands 36 created by annular grooves 22 and 26. As more clearly shown in FIG. 2, disc 32 is provided with one or more notches 38 in its outer periphery. Notches 38 extend inboard sufficiently to allow fluid to flow between the space above the piston 10 and annular groove 26. Notches 38 do not, however, extend inboard so far as to allow flow between annular groove 22 and annular groove 26.

The inner opening of valve disc 32 is sufficiently larger than the diameter of piston rod 14 in order that fluid may flow between disc 32 and piston rod 14. Thus, flow is permitted between the space above disc 32 and annular groove 22. One or more notches 40 may be formed in the inner periphery of disc 32 as a tuning feature to allow greater flow of the last described type.

As may be seen from the Figures, disc 34 is superimposed upon disc 32 and functions as a valve disc to govern the rebound flow between disc 32 and piston rod 14. This governing is possible because disc 34 has a dished or concave shape which becomes progressively flatter as rebound flow rate increases. FIG. 3 shows disc 34 in its fully flattened position. Disc 34 is made of a spring material, preferably steel, in order that it may have sufficient resilience to flatten as desired. The relationship of the shape of disc 34 to rebound flow rate will be explained in greater detail.

Disc 34 holds disc 32 in contact with piston 12 by clamping disc 32 about its outer periphery. In turn, disc 34 is maintained in contact with disc 32 by retainer 42 and compression spring 44. Retainer 42 has a plurality of holes 43 (three shown) formed near its rim to facilitate flow in both directions above the piston.

Flow through rebound ports 29 is partially governed by rebound disc stack 46. As shown in FIG. 3, high speed rebound flow through port 29 unseats disc stack 46 from annular groove 28. Disc stack 46 is held in bridging contact with annular groove 28 by concave washer 48 which is loaded by compression spring 50. Compression spring 50 is clamped onto piston rod 14 by retaining nut 52. Although a unitary rebound disc could be used, rebound disc stack 46 is preferably comprised of a plurality of discs rather than only a single disc because it has been found that a single disc having the flexural stiffness required to oppose flow through rebound ports 29 would be prone to fatigue failure due to repeated flexing of the disc in response to fluid flow. Although the assemblage of discs comprising disc stack 46 may possess the same or similar stiffness as a single thick disc each individual disc is of relatively much thinner construction so as to reduce the possibility of fatigue failure.

As a tuning feature, one or more notches 47 is placed in the outer periphery of that rebound disc which is nearest to piston 12. Thus, fluid will flow through rebound ports 29 and then through notches 47 even when disc stack 46 is seated bridgingly across annular groove 28.

As a second embodiment, discs 32 and 34 may be eliminated in favor of a single convex disc having the precise shape of disc 34 but provided with a notch in its outer periphery similar to notch 38 in the outer periphery of disc 32.

The operation of the piston assembly will now be explained in greater detail.

While operating in the compression mode, hydraulic fluid passes into the outboard annular groove 24 on the lower face of the generally cylindrical body 12 and then through compression port 20 and orifice port 30. During low speed compression fluid will flow through notches 38 and 40 in disc 32 as well as through the annular space between disc 32 and piston rod 14. At higher flow rates, i.e., at higher rates of compression, fluid pressure forces disc 32 from its normal position against upper face 16. When this occurs disc 34 and retainer 42 are similarly displaced upwardly against the force of spring 44. Fluid then flows freely through compression port 20 and orifice port 30 without restriction from disc 32.

When the wheel to which a shock absorber or suspension strut is attached strikes a bump in the roadway of sufficient size to displace the wheel upwardly it is important for the shock absorber or strut to release compression pressure rapidly in order that impact harshness will be minimized. In the case of the present device, this desirable result is aided by the configuration of upper disc retainer 42. As shown in FIG. 2, the surface of retainer 42 which contacts valve disc 34 is "warped". As a result, valve disc 34 is clamped by retainer 42 for less than its entire periphery. Preferably, less than one-half of the periphery of disc 34 will be contacted by retainer 42. In turn, segments of the periphery of disc 32 are thus subjected to lower clamping forces by disc 34 and this allows disc 32 to lift more quickly in response to compression flow because flow past the disc's more lightly clamped portions will assist in lifting disc 32 completely from its seat.

Limited compression flow will also be conducted through rebound port 29. This flow is limited because it originates through the relatively smaller notch 47 formed in the rebound disc closest to the top of the piston assembly and then into annular groove 28 and then through rebound port 29, outboard annular groove 26, and notches 38 in disc 32.

While operating in the rebound mode, hydraulic fluid passes through the compression, rebound, and orifice ports as follows. At low rebound rates, fluid passes through the annular space between the inner periphery of valve disc 34 and piston rod 14. This same flow continues through the notches 40 in disc 32 as well as through the second annular space lying between disc 32 and piston rod 14. Ultimately, the flow reaches compression port 20.

An additional path for low rate rebound flow is provided by notches 38 in disc 32. Fluid flows first through notch 38 and then through orifice port 30.

Flow from notches 38 will pass through rebound port 29 and then through notch 47. The primary low rate rebound flow will continue through compression port 20 even if notches 47 are present because notches 47 form a relatively small flow area.

During high speed rebound, disc valve 34 flattens as shown in FIG. 3 as a result of increased flow and the build-up of pressure above the piston. As disc 34 flattens, rebound flow through the annular space between disc 34 and piston rod 14 becomes constricted and flow through compression port 20 is restricted. The resultant pressure increase above the piston will be transmitted through rebound port 29 which will cause rebound stack 46 to open. Increased flow will therefore be established through rebound port 29 by way of notch 38. During this condition flow will continue through compression port 20 and orifice port 30 even though the flow is primarily through rebound port 29.

As those skilled in the art will appreciate, the sizes of the various notches and ports may be changed so as to establish the desired tuning of the shock absorber. Accordingly, rebound flow is established through rebound port 29 during high rate rebound notwithstanding flow through orifice port 30 because notch 38 is sized such that it will pass substantially more flow at high rate rebound than can be carried through orifice port 30. In other words, orifice port 30 is more akin to a bleed, rather than to a full flow port. It follows from this that flow through notch 38 is much greater than flow through port 30.

It should be noted that the sizes of the various notches in the components of the piston as well as the number of notches are tuning variables which may be optimized for the particular application at hand. Similarly, the decision to include orifice ports may be based on tuning considerations for although orifice ports do bypass the principal means used for controlling compression and rebound flow, the compression and rebound systems contain built-in bypass mechanisms. More specifically, limited compression flow may be conducted through the rebound port and vice-versa. These bypass mechanisms permit a softer ride over minor road surface imperfections.

Variations and modifications of the present invention are possible without departing from the spirit and scope as defined by the appended claims.

In my copending application Ser. No. 573,273, now abandoned, which is also entitled "Piston Assembly For Shock Absorber" and which has been filed concurrently herewith, I disclose another type of cross-drilled shock absorber piston.

The embodiments in which an exclusive property or privilege is claimed are defined as follows:

1. A piston assembly for a shock absorber comprising:
   (A) a generally cylindrical body attached to a piston rod and having
   (i) upper and lower faces,
   (ii) outboard and inboard annular grooves on each of said upper and lower faces,
   (iii) first means comprising ports connecting said upper inboard annular groove with said lower outboard annular groove for conducting hydraulic fluid through said generally cylindrical body during all compression and rebound strokes,
   (iv) second means comprising ports connecting said upper outboard annular groove with said lower inboard annular groove for conducting hydraulic fluid through said generally cylindrical body during all compression and rebound strokes;
   (B) first and second annular discs mounted abuttingly to the upper face of said cylindrical body wherein:
   (i) said first annular disc is more proximate the upper face of said cylindrical body and has a notch in its outer periphery whereby fluid may pass through said ports of said second means,
   (ii) said first annular disc has a central opening larger than the diameter of said piston rod whereby fluid may pass between said piston rod and said first annular disc,
   (iii) said second annular disc is of dished shape and is superimposed upon said first annular disc such that the outer periphery of each annular disc is in contact with the other, and
   (iv) said second annular disc is of flexible material such that said second annular disc will progressively flatten in response to fluid pressure acting above said piston assembly whereby rebound flow through said first means becomes constricted and rebound flow is caused to change its course from primarily said first means to primarily said second means;
   (C) a retainer clampingly engaged with the outer periphery of said second annular disc, said retainer being axially loaded in the direction of said second annular disc by means of a compression spring; and
   (D) a rebound disc stack comprised of at least one resilient disc clampingly and abuttingly engaged with said lower face of said cylindrical body whereby flow through said ports of said second means is resiliently resisted, said at least one resilient disc further comprising at least one notch in its outer periphery whereby hydraulic fluid may pass into and out of said inboard annular groove when said notched disc is in bridging contact with said inboard annular groove.

2. A piston assembly of claim 1 wherein said first means further comprises one or more ports running between said upper outboard annular groove and said lower outboard annular groove.

3. The piston assembly of claim 1 wherein said retainer associated with said second annular disc is formed such that less than the entire periphery of said second annular disc is clamped by said retainer.

* * * * *